United States Patent
Zhang et al.

(10) Patent No.: US 9,484,799 B2
(45) Date of Patent: Nov. 1, 2016

(54) SWITCHED CAPACITOR DC-DC CONVERTER WITH REDUCED IN-RUSH CURRENT AND FAULT PROTECTION

(71) Applicant: Linear Technology Corporation, Milpitas, CA (US)

(72) Inventors: Jindong Zhang, Fremont, CA (US); Jian Li, San Jose, CA (US)

(73) Assignee: Linear Technology Corporation, Milpitas, CA (US)

( * ) Notice: Subject to any disclaimer, the term of this patent is extended or adjusted under 35 U.S.C. 154(b) by 29 days.

(21) Appl. No.: 14/592,476

(22) Filed: Jan. 8, 2015

(65) Prior Publication Data

US 2015/0207401 A1    Jul. 23, 2015

Related U.S. Application Data

(60) Provisional application No. 61/928,745, filed on Jan. 17, 2014.

(51) Int. Cl.
  *H02M 1/32* (2007.01)
  *H02M 3/156* (2006.01)
  *H02M 3/158* (2006.01)
  *H02M 1/36* (2007.01)
  *H02M 3/07* (2006.01)

(52) U.S. Cl.
  CPC ............... *H02M 1/32* (2013.01); *H02M 1/36* (2013.01); *H02M 3/07* (2013.01); *H02M 3/156* (2013.01); *H02M 3/158* (2013.01); *H02M 3/1582* (2013.01); *H02M 3/1588* (2013.01)

(58) Field of Classification Search
  CPC ...................................................... H02M 1/32
  USPC .......................................................... 363/59
  See application file for complete search history.

(56) References Cited

U.S. PATENT DOCUMENTS

| | | | |
|---|---|---|---|
| 7,696,735 | B2 | 4/2010 | Oraw et al. |
| 8,427,113 | B2 | 4/2013 | Xing et al. |
| 2004/0227498 | A1 | 11/2004 | Okada |

(Continued)

FOREIGN PATENT DOCUMENTS

WO    2009155540 A1    12/2009

OTHER PUBLICATIONS

Linear Technology Corporation Data Sheet, "LT4256-1/LT4256-2 Positive High Voltage Hot Swap Controllers".

(Continued)

*Primary Examiner* — Jeffrey Gblende
*Assistant Examiner* — Trinh Dang
(74) *Attorney, Agent, or Firm* — Patent Law Group LLP; Brian D. Ogonowsky

(57) ABSTRACT

To reduce in-rush currents into a switched capacitor DC/DC converter and detect voltage and current faults, a converter controller is housed along with a current limit series transistor and fault detection circuitry. The series transistor is controlled to limit the in-rush current to a predetermined maximum level during start-up. If the duration of the current limit level, or the time for Vout to achieve a target voltage, exceeds a first threshold time, a first fault detector in the package shuts off the series transistor. During steady state operation, if the input current reaches the limit for a second threshold time or if Vout extends outside a certain range for the second threshold time, a second fault detector in the package shuts off the series transistor.

23 Claims, 6 Drawing Sheets

(56) References Cited

U.S. PATENT DOCUMENTS

| | | | |
|---|---|---|---|
| 2008/0084712 A1* | 4/2008 | Wang | H02M 1/32 363/21.01 |
| 2008/0150500 A1* | 6/2008 | Gurcan | H02M 3/156 323/271 |
| 2009/0072803 A1 | 3/2009 | Tiew et al. | |
| 2010/0007316 A1* | 1/2010 | Miller | H01L 27/0207 323/282 |

OTHER PUBLICATIONS

EPO, "Extended European Search Report", EP Counter-part application 15000109.7, dated May 20, 2015, 8 pages.

Fred Friend, "Cold load pickup issues" Protective Relay Engineers, 2009 62nd Annual Conference for, IEEE, Piscataway, NJ, USA, Mar. 30, 2009, pp. 176-187, XP031461742.

* cited by examiner

SWITCHED CAPACITOR DC-DC CONVERTER WITH REDUCED IN-RUSH CURRENT AND FAULT PROTECTION

CROSS-REFERENCE TO RELATED APPLICATIONS

This application claims priority to U.S. provisional application Ser. No. 61/928,745, filed Jan. 17, 2014, by Jindong Zhang et al., incorporated herein by reference.

FIELD OF THE INVENTION

This invention relates to DC/DC converters and, in particular, to a switched capacitor DC/DC converter with a current limit circuit and a fault protection circuit.

BACKGROUND

Switched capacitor networks, also known as charge pumps, are commonly used to multiply or divide an input voltage Vin. The output voltage Vout is proportional to Vin, such as 2×, 3×, ½×, ⅓×, etc. The load connected to Vout may be a conventional resistive type load, a voltage regulator (e.g., a buck regulator), or any other type of load.

One problem with such switched capacitor DC/DC converters is that the input voltage is directly coupled to the capacitors. Upon start-up of the system, when Vin is first applied, the in-rush current into the capacitors before reaching steady state can easily exceed 1000 A for a few nanoseconds with a low impedance interconnection. This imposes various constraints and risks on the design.

FIG. 1 illustrates a conventional 2:1 switched capacitor converter 10 which outputs a voltage Vout that is approximately one-half of the input voltage Vin. During steady state operation, the FETs Q1-Q4 are switched, as shown in FIG. 2, to cyclically charge and discharge capacitor C2, called a flying capacitor. The body diodes of the FETs are shown. The capacitor C2 is repeatedly charged to Vin/2 when connected across the capacitor C1, and the charge is transferred to the capacitor C3 (and the load 12) when connected across the capacitor C3. The capacitors C1 and C3 are initially charged by Vin at start-up, where the node of C1 and C3 is at Vin/2. Typically, capacitors are connected external to any controller package due to their large size. The switches Q1-Q4 may also be external to the package if the currents are high. The input voltage Vin is directly connected to the top terminal of the FET Q1 and the capacitor C1.

The 2:1 switched capacitor converter can properly operate without capacitor C1. In such a case, when the FETs Q1 and Q3 are on, the capacitors C2 and C3 are charged by Vin in series. When FETs Q2 and Q4 are on, the capacitors C2 and C3 are in parallel. This forces the capacitor C2 and C3 voltages to be very close to each other at about Vin/2.

FIG. 3 illustrates how, upon the Vin power supply powering up at time T0, when the capacitors C1-C3 have a zero initial voltage, the in-rush current can easily exceed 1000 A, depending on any parasitic resistances in the path. The high current may only last less than 1 microsecond but can easily exceed the FETs' safe operating current and needs to be taken into account in the design. The output voltage Vout only reaches its steady state voltage after the capacitors C1, C2, and C3 are fully charged and the switches Q1-Q4 are controlled as shown in FIG. 2. The Vout waveform shows some ringing after the in-rush current.

In a fault condition, such as the capacitor C3 becoming a short circuit, since there is no inductor in the switched capacitor circuit to limit current, the input in-rush current can rise up quickly to a very high level, causing FET failure and system damage.

What is needed is a complete circuit for controlling a switched capacitor DC/DC converter, where the in-rush current is reduced. The circuit should also detect faults during operation and take appropriate safety measures.

SUMMARY

In a preferred embodiment, a switch controller circuit for a switched capacitor DC/DC converter is housed in the same package as a current limit circuit and a fault detection circuit. Rather than an input voltage being connected directly to the switched capacitor converter, the input voltage is connected to a current limit circuit that controls a series FET between the input lead and the capacitors. The FET also serves as the protection FET when a fault is detected during start-up or during steady state. Different fault detection techniques are used during start-up and steady state.

Upon start-up, the series FET, connected in a feedback loop, limits the in-rush current to a controlled maximum while the output voltage Vout of the switched capacitor converter ramps up to its steady state Vout within a predetermined time limit. When the in-rush current is below the current limit threshold, the series FET is turned fully on to supply the full input voltage to the switched capacitor converter.

A fault detection circuit includes a timer that times the duration of the in-rush current. If the duration is outside a first threshold time, the system turns off the series FET and issues a fault signal. Also, during the start-up phase, if Vout is not within a target voltage range within the first threshold time, the system turns off the series FET and issues a fault signal.

Another circuit detects faults during steady state operation. If, during steady state operation, the converter's output voltage Vout is outside the range of an upper threshold voltage and a lower threshold voltage for more than a second threshold time, an output voltage fault occurs, and the series FET is turned off. The system then issues a fault signal. The upper and lower threshold voltages are tied to Vin/N (where N equals the target Vin/Vout), with a small positive or negative offset, respectively. Further, if during steady state operation, the input current reaches the current limit for longer than the second threshold time, the series FET is turned off and a fault signal is issued. The first threshold time may be different from the second threshold time.

The capacitor switches may be inside or outside the package, depending on the current requirements of the switches.

The switched capacitor converter may multiply or divide the input voltage. The load connected to the output of the converter may be a resistive load, a voltage regulator, or any other type of load.

Various embodiments are described.

BRIEF DESCRIPTION OF THE DRAWINGS

Elements that are the same or equivalent are labeled with the same numeral.

DETAILED DESCRIPTION

Figure 1:
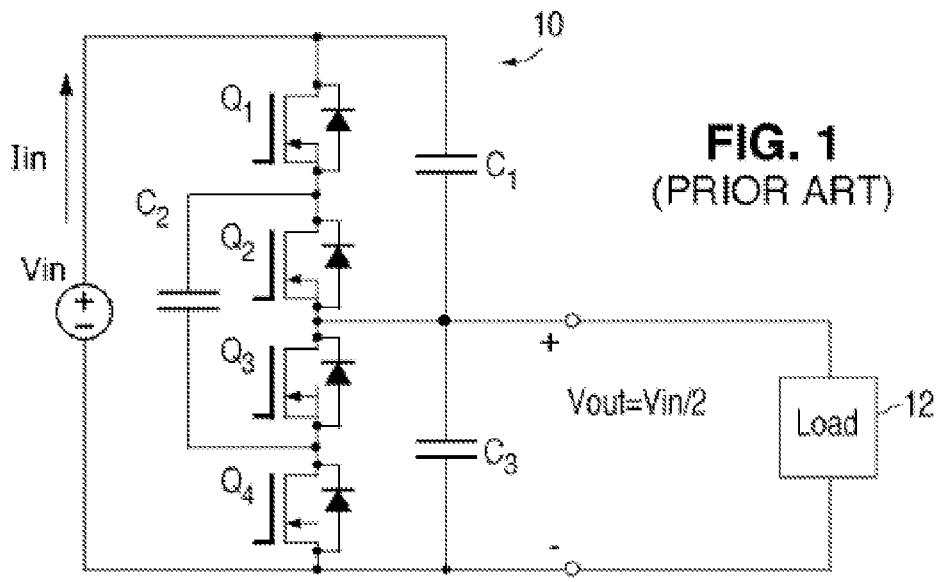
FIG. 1 illustrates a conventional switched capacitor DC/DC converter.
Figure 4:
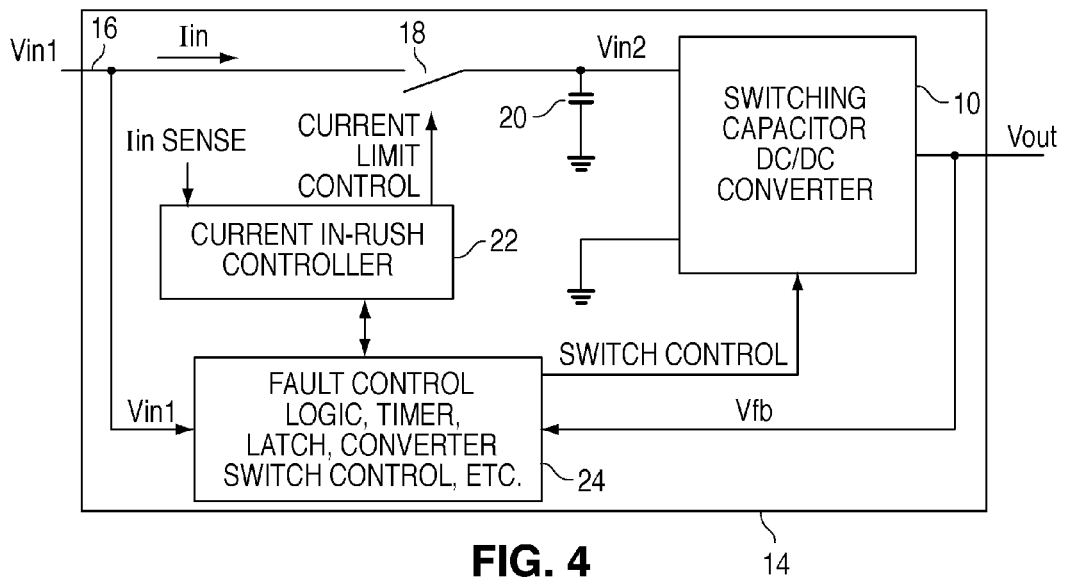
FIG. 4 illustrates a high level schematic of the inventive circuit.

FIG. 4 illustrates a high level schematic of the inventive circuit containing the switched capacitor converter 10 of FIG. 1. In one embodiment, the entire circuit, except the capacitors C1-C3 in FIG. 1, is within a single package 14 having leads for connection to a printed circuit board.

The input voltage Vin1 terminal 16 of the package 14 is coupled to a power supply and to a first terminal of a series transistor, such as an FET 18. A second terminal of the FET 18 is coupled to the input of the switched capacitor converter 10 and applies an input voltage Vin2 to the converter 10. Vin2 would be coupled to the top terminal of the capacitor C1 in FIG. 1. A filter capacitor 20 is coupled to the second terminal of the FET 18.

During operation, the input current Iin is sensed, such as with a low value series sense resistor, and a signal corresponding to Iin is applied to a current in-rush controller 22. The controller 22 drives the gate of the FET 18 during start-up so that Iin is at a settable current limit. The controller 22 maintains Iin at the current limit until all the capacitors in the converter 10 are substantially fully charged. At that time, Iin will go below the current limit, and the controller 22 increases the gate voltage of the FET 18 until the FET 18 is fully conducting. At that time, Vin2 will approximately equal Vin1, and steady state operation can begin.

Figure 5:
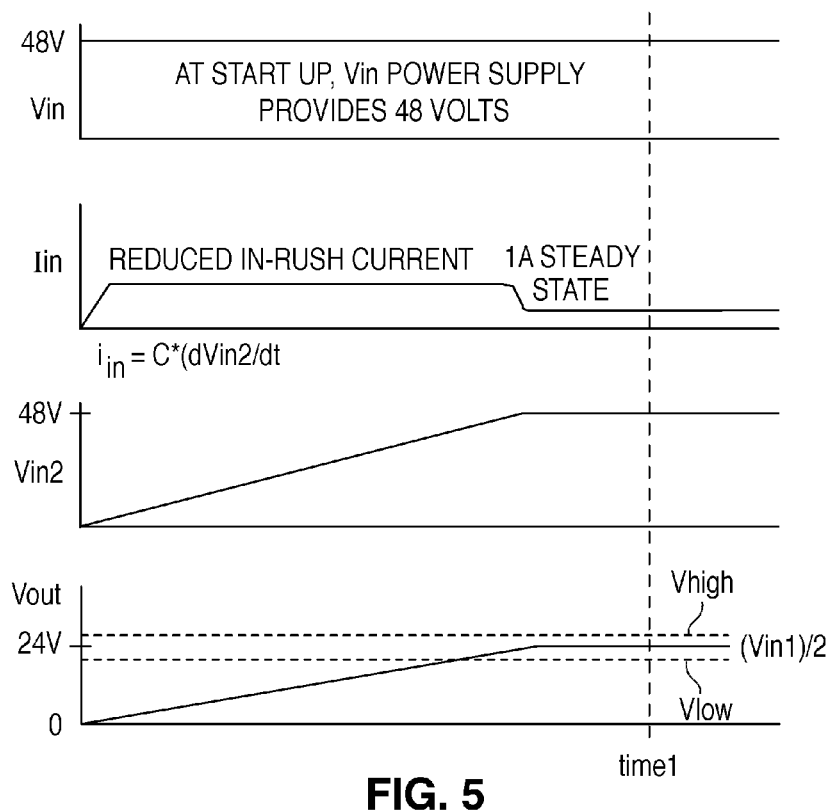
FIG. 5 illustrates various waveforms within the circuit of FIG. 4 at start-up.

FIG. 5 illustrates various waveforms within the circuit of FIG. 4 at start-up, assuming Vin1 is 48V. As shown, there is a rapid ramping up of Iin until the current limit is reached, such as 3-10× the steady state current. Iin remains at the current limit until the capacitors are fully charged. While Iin is being limited, Vin2 ramps up until it is at the steady state voltage of about 48V. At the same time, the converter 10 switches (Q1-Q4 in FIG. 1) are controlled to ramp up an output voltage Vout to approximately 24V, assuming the converter is a (Vin1)/2 divider.

The output voltage Vout is detected along with the time of the current limiting. If the current limiting takes longer than a threshold time (time1), or if Vout is outside a certain range (between Vhigh and Vlow) beyond the threshold time (time1), a fault is assumed by the circuit block 24, and the controller 22 shuts down the FET 18 and generates a fault report signal.

If there is no fault during the start-up phase, the circuit block 24 continues to control the switches Q1-Q4 (FIGS. 1 and 2) to generate the output voltage Vout of approximately (Vin1)/2 to achieve a steady state of operation.

Figure 6:
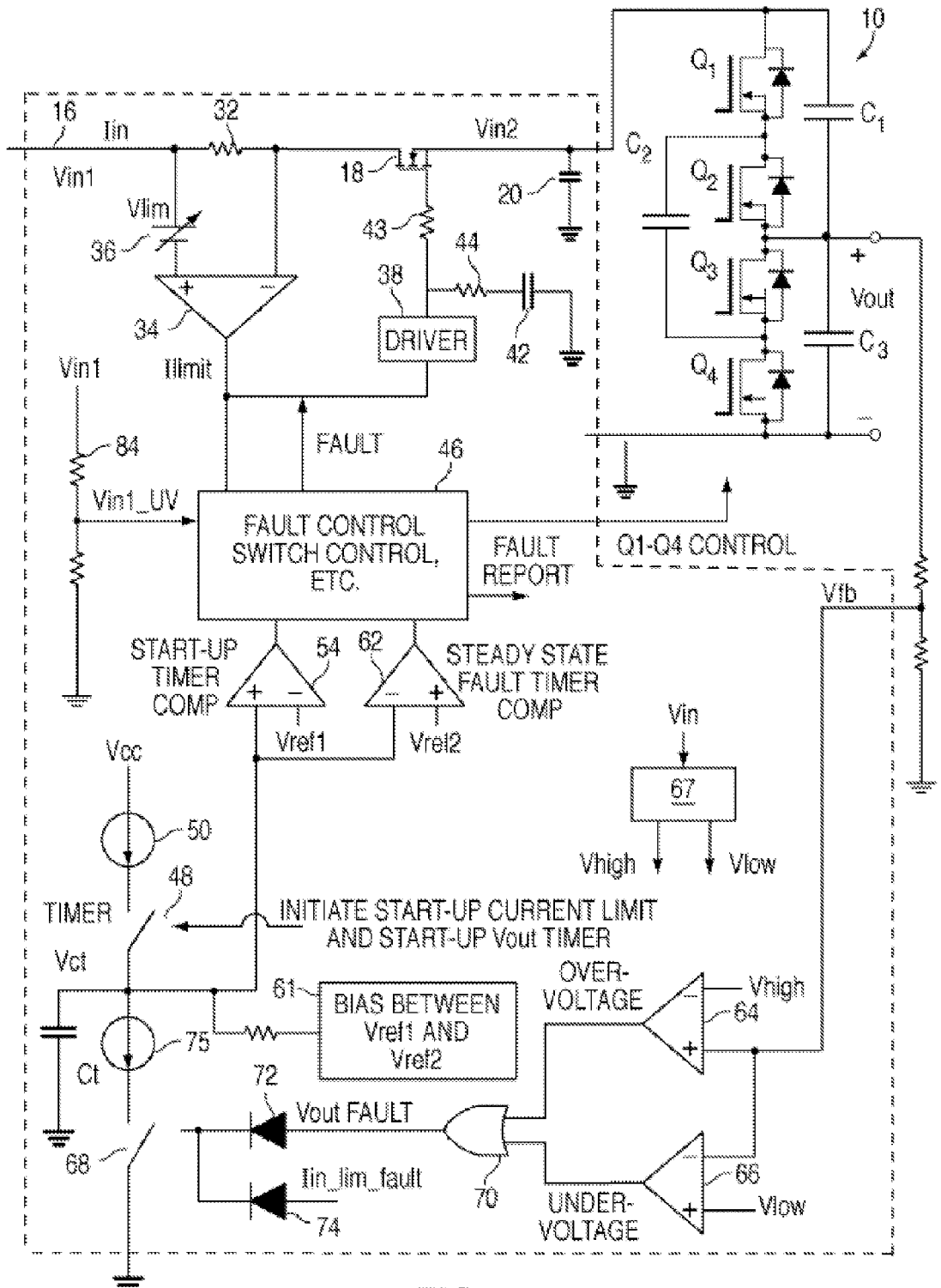
FIG. 6 illustrates the packaged circuit of FIG. 4 in more detail.

FIG. 6 illustrates one embodiment of the circuit of FIG. 4 in more detail. The operation of the circuit of FIG. 6 will be described with reference to the flowcharts of FIGS. 7A and 7B.

Figure 7A:
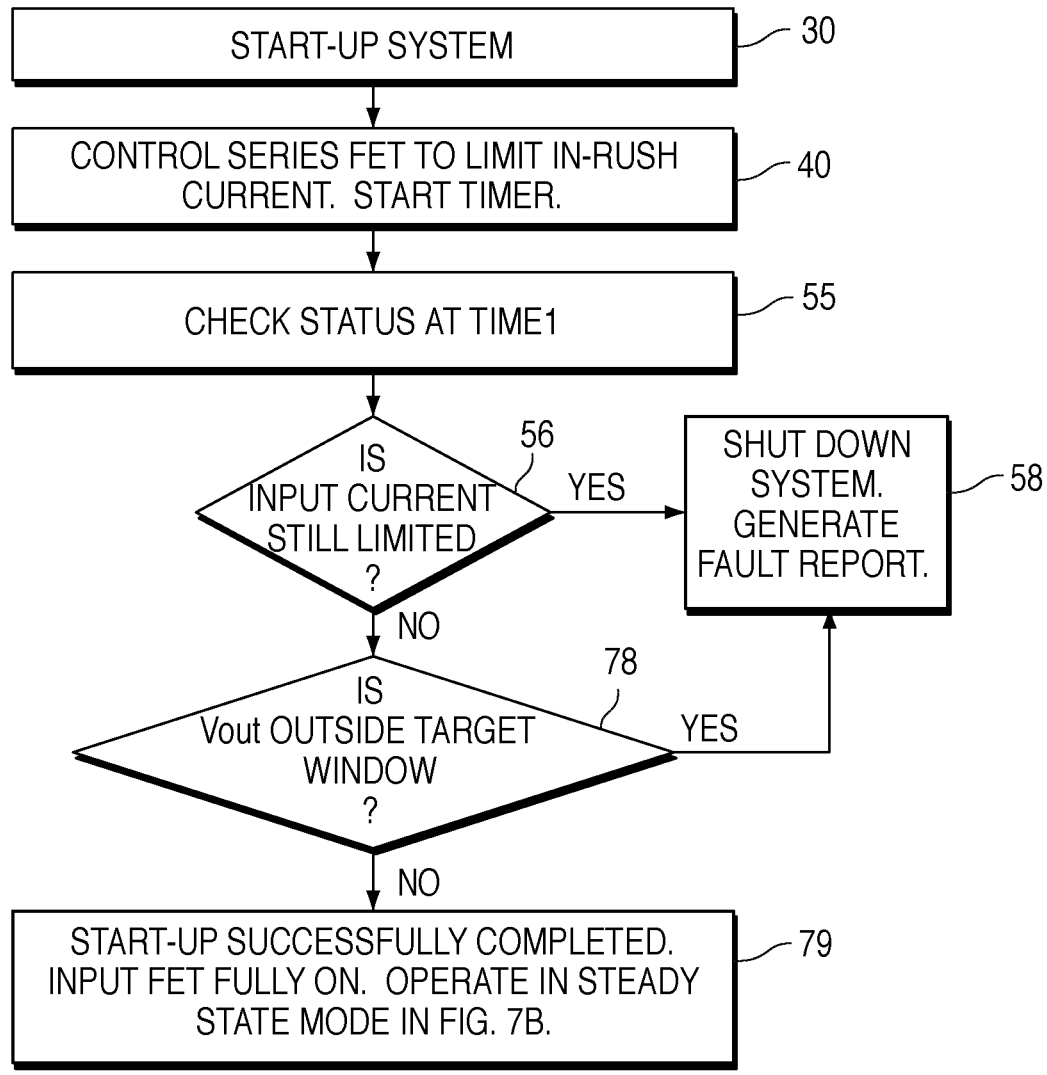
FIG. 7A is a flowchart identifying steps performed by the circuit of FIG. 6 during the start-up phase.

In step 30 of FIG. 7A, the system is started up by the power supply generating Vin1.

The current into the converter 10 flows through a low value series resistor 32 and the FET 18 (or other type of transistor or controllable conductor). The voltage across the resistor 32 is detected by a comparator 34. An offset voltage Vlim is generated by a voltage source 36. When the voltage across the resistor 32 exceeds Vlim, the comparator 34 generates a logical 1, indicating that the input current Iin is at or above the current limit threshold.

The output of the comparator 34 controls the gate drive voltage to the FET 18 via the gate driver 38. The driver 38 generates a gate voltage sufficient to conduct a current through the FET 18 such that the inputs into the comparator 34 do not exceed the tripping threshold. Therefore, at start-up, the in-rush current to charge the capacitors C1, C2, C3, and 20 is at the current limit threshold (step 40 in FIG. 7). A first timer is also started, as described below, by the detection of the input current being at the current limit. The capacitor 42 and resistors 43 and 44 prevent oscillations. The gate driver 38 includes a level shifter and logic.

Since the input current is limited, the capacitors C1, C2, C3, and 20 will charge at a much slower rate compared to if there was no current limiting. This is shown in FIG. 5 by Iin being at a limited value and Vin2 ramping up to 48V at a relatively slow rate (by the various capacitors charging).

Figure 2:
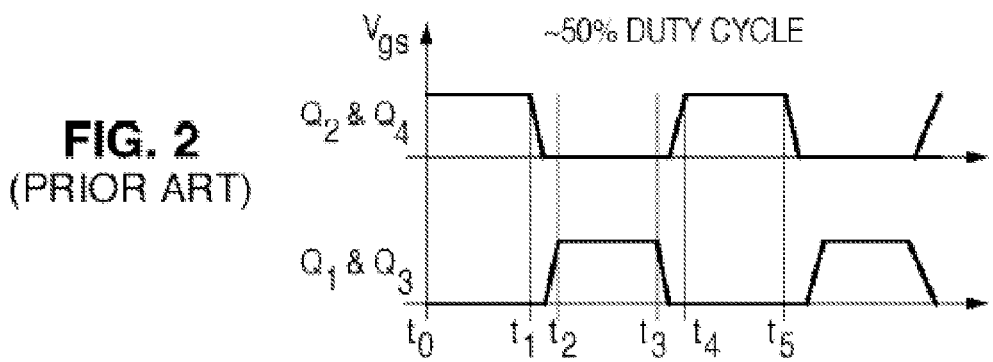
FIG. 2 illustrates the signals applied to the switches in FIG. 1.
Figure 3:
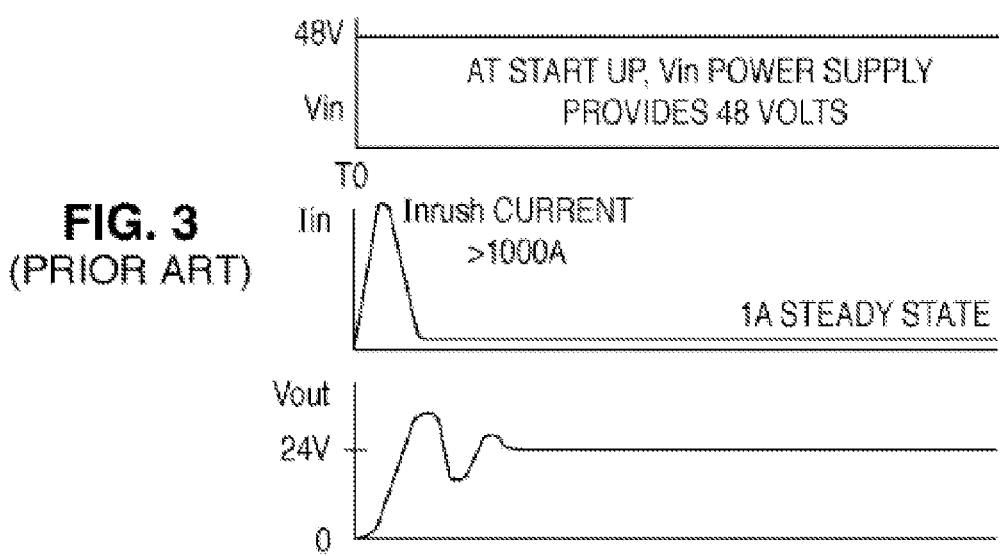
FIG. 3 illustrates various waveforms generated in the converter of FIG. 1 at start-up.

During the ramping up of Vin2, the converter 10 is switched, as described with respect to FIGS. 1 and 2.

A divided Vout is fed back to comparators 64 and 66 as Vfb. A high threshold voltage value Vhigh is applied to the comparator 64, and a low threshold value Vlow is applied to the comparator 66. N is the targeted switched capacitor circuit conversion ratio, i.e., N equals $V_{IN1}/V_{OUT}$. The Vhigh threshold is set at 1/N Vin1 plus a positive x % Vin1 offset, then divided by the same percentage that Vout is divided. The Vlow threshold is set at 1/N Vin1 minus a y % Vin1 offset, then divided by the same percentage that Vout is divided. A simple resistive network and charge pump circuit 67 connected to Vin1 may be used to generate Vhigh and Vlow. Therefore, Vhigh and Vlow follow the input voltage Vin instead of being fixed reference voltages. Other circuits may be used to generate Vhigh and Vlow. If Vout is between the two thresholds, both comparators 64 and 66 output a logical 0. If Vout is outside of either threshold, one of the comparators 64/66 will output a logical 1.

When Vin2 approximately equals Vin1 and Vout reaches the target Vin1/N level, the start-up is completed. In the example, Vout is about ½ Vin1 and N equals two. However, any type of switched capacitor converter can be used to multiply or divide Vin1.

Once the capacitors have been adequately charged, the input current Iin drops well below the current limit threshold (since there is no more in-rush current), and the maximum gate voltage is applied to the FET 18 (since the output of the comparator 34 is zero) to make it essentially a closed switch.

At the beginning of the start-up phase, the timer switch 48 is closed. The input FET 18 is turned on with limited maximum current to ramp up the voltage Vin2. The FETs Q1-Q4 are switched by circuit block 46 to ramp up the output voltage Vout. A current source 50 charges a timer capacitor Ct to generate a ramping voltage Vct. The Vct and a reference voltage Vref1 are applied to inputs of the start-up timer comparator 54, where Vref1 corresponds to the time1 in FIG. 5. If at time 1 (Vct ramps up above Vref1), the comparator 34 output is still a logical 1 (indicating input FET 18 still in current limit) or the OR gate 70 output is still a logical 1 (indicating Vout is outside of Vlow-Vhigh window range), the fault control circuit 46 turn off input FET 18 and issue a fault report signal. Vref1 is selected to be greater than an expected time of the in-rush current being at the current limit and an expected time of ramping up output voltage Vout to its target range. The step of effectively checking the status of the in-rush current limit and Vout level at time1 is step 55 in FIG. 7A. Simple logic may be used to carry out this function.

If there is no start-up fault, the FETs Q1-Q4 continue to be switched in the conventional manner by the circuit block 46. In steady state, Vout is approximately ½ Vin1 (step 79). The timer switch 48 and 68 are open and the timer capacitor Ct is biased by a voltage source 61 at a level higher than Vref1 and Vref2.

Figure 7B:
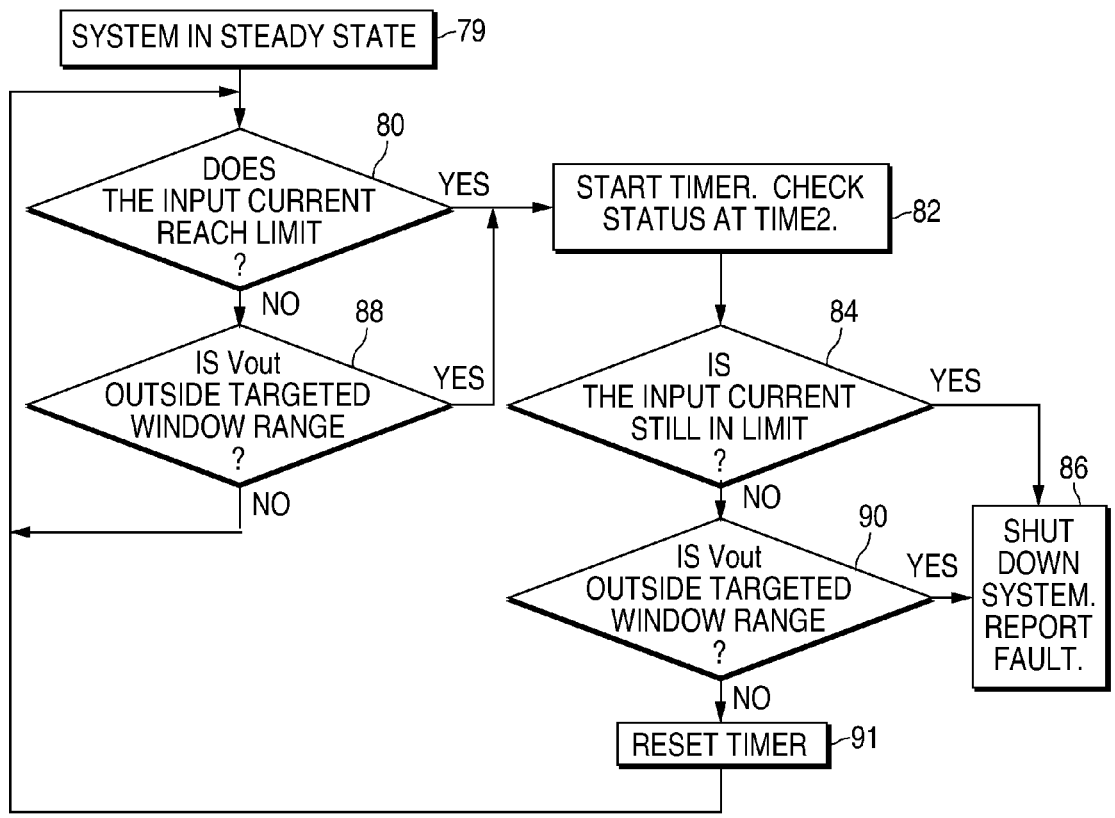
FIG. 7B is a flowchart identifying steps performed by the circuit of FIG. 6 during steady state.

FIG. 7B shows steps performed during the steady state operation after time1.

In the steady state, the input current should be below the current limit and Vout should be between Vhigh and Vlow.

If, during the steady state phase, the output of the current limit comparator 34 goes high (input current is at the limit) or Vout is outside of the range of Vhigh and Vlow, either the diode 72 or the diode 74 (acting as an OR gate) will become forward biased and close the timer switch 68 to start a second timer. This is shown in steps 80, 82, 84, 88, and 90 of FIG. 7B.

When the switch 68 is closed, the timer capacitor Ct discharges, via the current source 75, to generate a ramping down Vct. If Vout remains outside the threshold for too long (time2 in step 82), indicating a fault, Vct will go below Vref2 to trigger the comparator 62 to signal a fault. The circuit block 46 then shuts off the FET 18, stops any further switching of the FETs Q1-Q4, and issues a fault report signal (steps 90 and 86 in FIG. 7B).

Similarly, if the current limit level remains for more than a threshold period (time2), the comparator 62 will be triggered to indicate a fault, and the FET 18 will be shut off (steps 84 and 86). Thus, the same timer is used during the steady state to detect input current and Vout faults.

The various timer thresholds depend on the expected duration of non-fault transients. The currents generated by the current sources 50 and 75 may be different.

If the input current falls below the current limit within time2 and/or Vout returns to its target range within time2 (a non-fault condition), the switch 68 is opened and the capacitor Ct is reset (step 91) until the next event is detected.

To prevent the switch 68 from being closed during start-up while there is in-rush current and Vout is outside the target range, the control signal to the switch 68 may only be enabled (such as by another switch) after a certain time has elapsed after start-up during the steady state phase, such as some time after time1.

A Vin1 undervoltage lockout feature is also included in the package 14. Vin1 is applied to a resistor divider 84 to provide a Vin1_UV signal to the circuit block 46. This voltage is compared to a reference voltage to determine if Vin1 is adequately high to properly operate the system.

Figure 8:
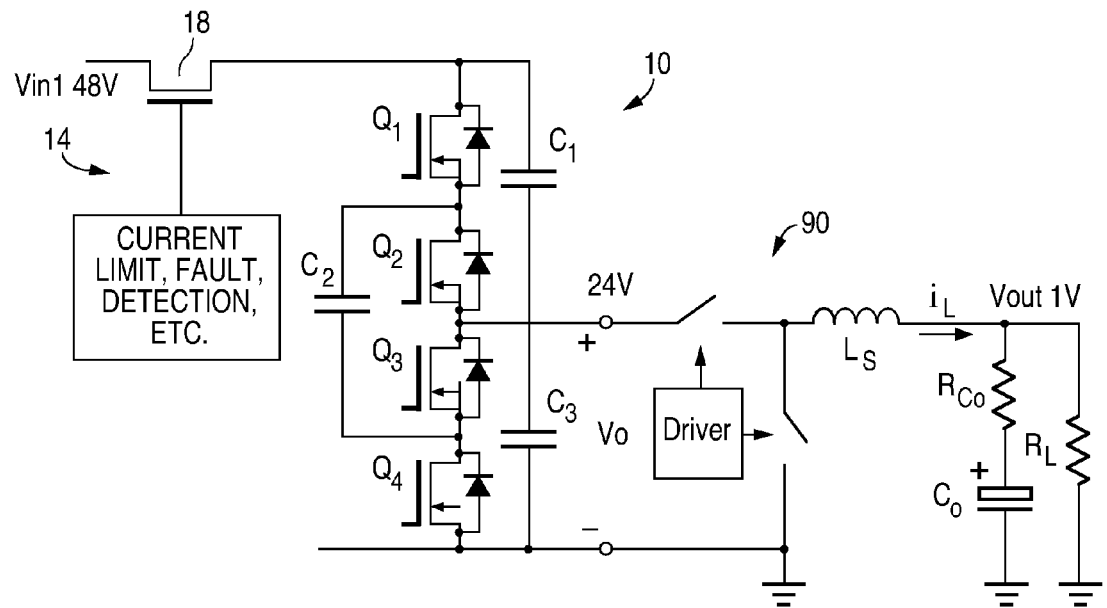
FIG. 8 illustrates how the load for the capacitor network may be a buck regulator.

Additional features may be included in the package 14. The load connected to receive Vout may be any type of load, such as a resistive load or a voltage regulator. FIG. 8 illustrates how the load may be a conventional buck regulator 90 to output any voltage level, such as 1V.

Figure 9:
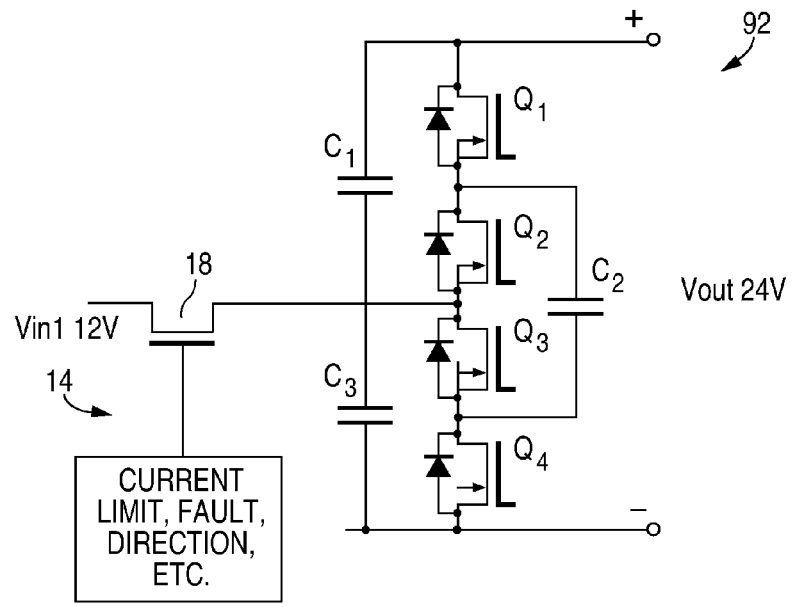
FIG. 9 illustrates how the capacitor network may be connected to multiply the input voltage.

FIG. 9 illustrates how a switched capacitor converter 92 may be connected in a reverse configuration to multiply the input voltage Vin1.

While particular embodiments of the present invention have been shown and described, it will be obvious to those skilled in the art that changes and modifications may be made without departing from this invention in its broader aspects and, therefore, the appended claims are to encompass within their scope all such changes and modifications that are within the true spirit and scope of this invention.

What is claimed is:

1. A circuit for controlling a switched capacitor DC/DC converter to generate an output voltage Vout comprising:
   a controller circuit for generating control signals for controlling switches in the switched capacitor DC/DC converter to generate Vout;
   an input terminal for an input voltage Vin1;
   an input current sensor for generating an input current signal corresponding to an input current;
   a current limit circuit coupled to the input current sensor for detecting when the input current has reached a current limit level and for controlling in-rush current into the converter so as not to exceed the current limit level, wherein the current limit circuit controls the in-rush current so as not to exceed a predetermined maximum current level;
   a series transistor coupled between the input terminal and the converter;
   a series transistor controller for controlling the series transistor to limit the in-rush current into the converter to the current limit level during start-up when Vin1 is applied to the input terminal;
   a fault detection circuit comprising:
      a first fault circuit for detecting whether there is an input current fault or a Vout fault during a start-up phase of the circuit and for turning off the series transistor if a fault is detected during the start-up phase; and
      a second fault circuit for detecting whether there is an input current fault or a Vout fault during a steady state phase of the circuit and for turning off the series transistor if a fault is detected during the steady state phase.

2. The circuit of claim 1 wherein the series transistor controller is connected in a loop with the series transistor, the current limit circuit, and the input current sensor.

3. The circuit of claim 1 wherein the first fault circuit comprises a first timer, and the second fault circuit comprises a second timer.

4. The circuit of claim 1 wherein, except for one or more capacitors, the controller circuit, the series transistor, the current limit circuit, the series transistor controller, the first fault circuit, and the second fault circuit are housed in a single package.

5. The circuit of claim 3 wherein the first timer signals a fault after a first time limit if the input current is at the current limit level at the time of the first time limit, signaling that there is an input current fault, and
   wherein the first timer also signals a fault after the first time limit if Vout is not within a target range at the time of the first circuit limit, signaling that there is a Vout fault.

6. The circuit of claim 3 wherein the first timer is started at an initiation of start-up.

7. The circuit of claim 3 wherein the first timer comprises a first switch coupling a first current source to a timer capacitor, where a capacitor voltage is compared to a first reference voltage by a first comparator.

8. The circuit of claim 5 wherein the second timer is started when the input current reaches the current limit level, wherein the second timer signals that there is an input current fault if the input current remains at the current limit level for a second time limit, and
wherein the second timer is also started when Vout is not within the target range, wherein the second timer signals that there is a Vout fault if Vout remains outside the target range for the second time limit.

9. The circuit of claim 7 wherein the second timer comprises a second switch coupling a second current source to the timer capacitor, where the capacitor voltage is compared to a second reference voltage by a second comparator.

10. The circuit of claim 7 wherein the timer capacitor is reset when there is no fault condition.

11. The circuit of claim 8 wherein the first time limit is different from the second time limit.

12. The circuit of claim 8 further comprising a voltage generator coupled to receive the input voltage Vin1, the voltage generator generating a first voltage greater than Vin1/N and generating a second voltage lower than Vin1/N, wherein N equals Vin1/Vout in steady state and the first voltage and the second voltage define the target range of Vout.

13. The circuit of claim 12 wherein Vout is compared to the first voltage and the second voltage by a first comparator and a second comparator to determine if Vout is within the target range.

14. A method for controlling a switched capacitor DC/DC converter to generate an output voltage Vout comprising:
receiving, at an input terminal, an input voltage Vin1 for powering the switched capacitor DC/DC converter;
generating, by a controller circuit, control signals for controlling switches in the converter to generate Vout;
sensing an input current, by an input current sensor, and generating an input current signal corresponding to an input current;
generating a current limit signal, by a current limit circuit, coupled to the input current sensor for controlling in-rush current into the converter so as not to exceed a current limit level;
limiting the in-rush current to the current limit level by a series transistor coupled between the input terminal and the converter,
wherein the series transistor is controlled by the current limit circuit to limit the in-rush current into the converter to the current limit level during start-up when Vin1 is applied to the input terminal;
detecting, by a first fault circuit, whether there is an input current fault or a Vout fault during a start-up phase of the circuit and turning off the series transistor if a fault is detected during the start-up phase; and
detecting, by a second fault circuit, whether there is an input current fault or a Vout fault during a steady state phase of the circuit and turning off the series transistor if a fault is detected during the steady state phase.

15. The method of claim 14 wherein the first fault circuit comprises a first timer, and wherein the second fault circuit comprises a second timer.

16. The method of claim 14 further comprising generating, by a voltage generator coupled to receive the input voltage Vin1, a first voltage greater than a target Vout and generating a second voltage lower than the target Vout, wherein the first voltage and the second voltage define the target range of Vout.

17. The method of claim 15 wherein the first timer signals a fault after a first time limit if the input current is at the current limit level at the time of the first time limit, signaling that there is an input current fault, and
wherein the first timer also signals a fault after the first time limit if Vout is not within a target range at the time of the first circuit limit, signaling that there is a Vout fault.

18. The method of claim 15 wherein the first timer is started at an initiation of start-up.

19. The method of claim 15 wherein the first timer comprises a first switch coupling a first current source to a timer capacitor, where a capacitor voltage is compared to a first reference voltage by a first comparator.

20. The method of claim 17 wherein the second timer is started when the input current reaches the current limit level, wherein the second timer signals that there is an input current fault if the input current remains at the current limit level for a second time limit, and
wherein the second timer is also started when Vout is not within the target range, wherein the second timer signals that there is a Vout fault if Vout remains outside the target range for the second time limit.

21. The method of claim 19 wherein the second timer comprises a second switch coupling a second current source to the timer capacitor, where the capacitor voltage is compared to a second reference voltage by a second comparator.

22. The method of claim 20 wherein the first time limit is different from the second time limit.

23. The method of claim 21 wherein the capacitor is reset when there is no fault condition.

* * * * *